(12) United States Patent
Clausen

(10) Patent No.: US 6,304,378 B1
(45) Date of Patent: Oct. 16, 2001

(54) REAR PROJECTION SCREEN ASSEMBLY HAVING A PROJECTION SCREEN WITH REFLECTING RIB LENSES

(75) Inventor: Erik Clausen, Gentofte (DK)

(73) Assignee: Scan Vision Screen ApS, Roskilde (DK)

( * ) Notice: Subject to any disclaimer, the term of this patent is extended or adjusted under 35 U.S.C. 154(b) by 0 days.

(21) Appl. No.: 09/462,142

(22) PCT Filed: Jul. 3, 1998

(86) PCT No.: PCT/DK98/00307

§ 371 Date: Mar. 30, 2000

§ 102(e) Date: Mar. 30, 2000

(87) PCT Pub. No.: WO99/01794

PCT Pub. Date: Jan. 14, 1999

(30) Foreign Application Priority Data

Jul. 4, 1997 (DK) .................................................. 0801/97

(51) Int. Cl.[7] ............................ G03B 21/56; G03B 21/60
(52) U.S. Cl. ............................................... 359/456; 359/460
(58) Field of Search ................................... 359/453, 456, 359/460, 455, 457

(56) References Cited

U.S. PATENT DOCUMENTS

| | | | |
|---|---|---|---|
| 3,578,841 | 5/1971 | Elmer | 359/457 |
| 4,418,986 | 12/1983 | Yata et al. | 359/456 |
| 4,468,092 | * 8/1984 | Inoue et al. | 359/457 |
| 4,469,402 | 9/1984 | Yata et al. | 359/457 |
| 4,509,822 | 4/1985 | Clausen et al. | 359/456 |
| 4,561,720 | * 12/1985 | Clausen et al. | 359/457 |
| 4,927,233 | * 5/1990 | Nakanishi et al. | 359/456 |
| 4,941,732 | * 7/1990 | Umeda et al. | 359/456 |
| 5,428,476 | 6/1995 | Jensen et al. | 359/457 |

FOREIGN PATENT DOCUMENTS

| | | |
|---|---|---|
| 0 361 918 | 4/1990 | (EP) . |
| WO 97/35228 | 9/1997 | (WO) . |

* cited by examiner

*Primary Examiner*—Christopher E. Mahoney
(74) *Attorney, Agent, or Firm*—Finnegan, Henderson, Farabow, Garrett & Dunner, L.L.P.

(57) ABSTRACT

A projection screen assembly including a projection screen having an illuminated rear side and a light dispersing front side for showing an image with substantially homogeneous luminosity over a wide viewing angle. The light dispersing front side includes a plurality of closely positioned, substantially parallel and, in the use position of the screen, vertically extending lens elements including two inclined reflecting lens crests, and an intermediate lens. The projection screen is characterized by first and second reflecting rib lenses having planes of symmetry inclined toward each other or away from each other, respectively, and a third reflecting rib lens having a plane of symmetry which is normal to the plane of the screen. The use of a plurality of lenses that are approximately identical, but having different inclinations, provide enhanced homogenous luminosity.

9 Claims, 10 Drawing Sheets

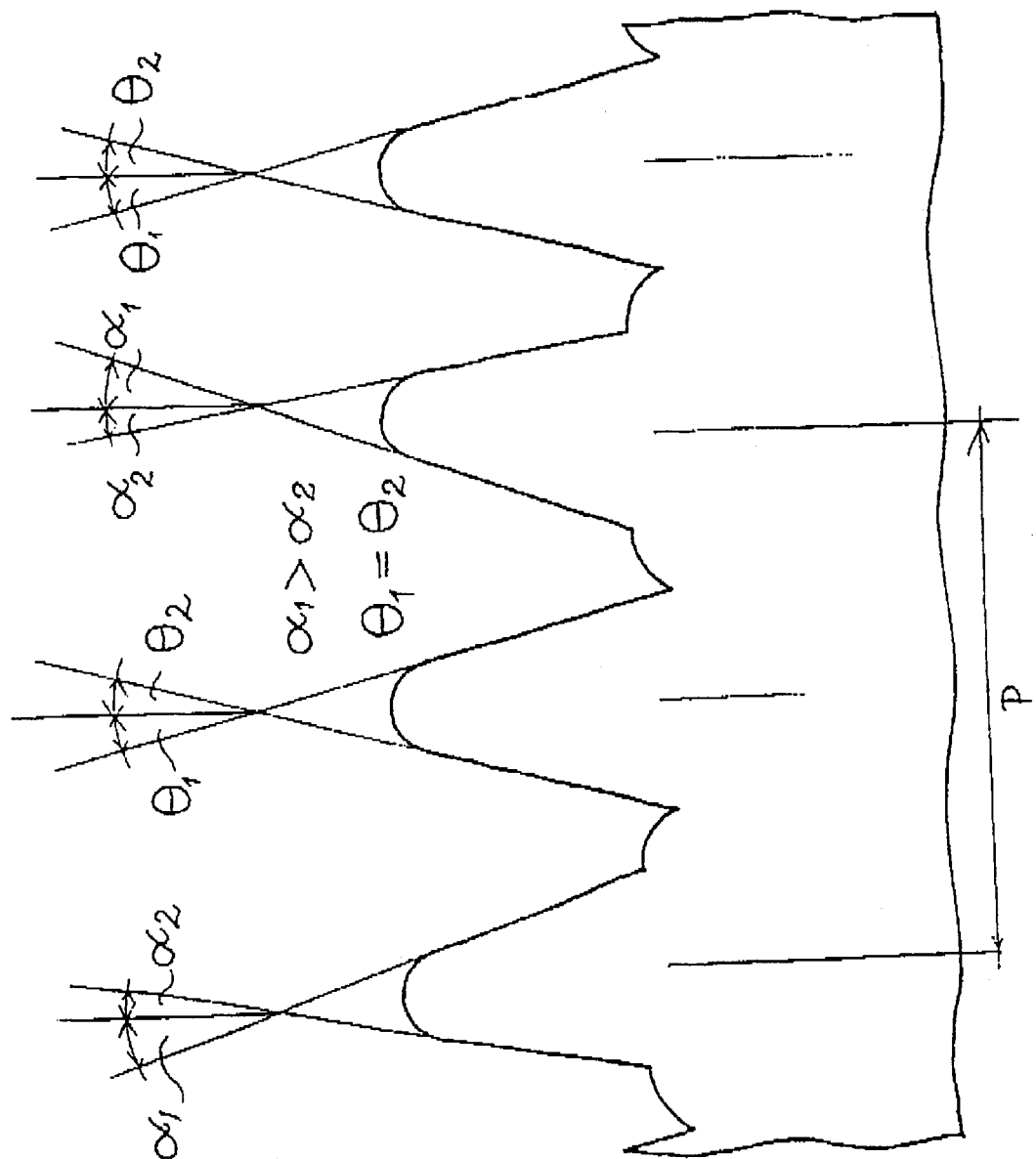

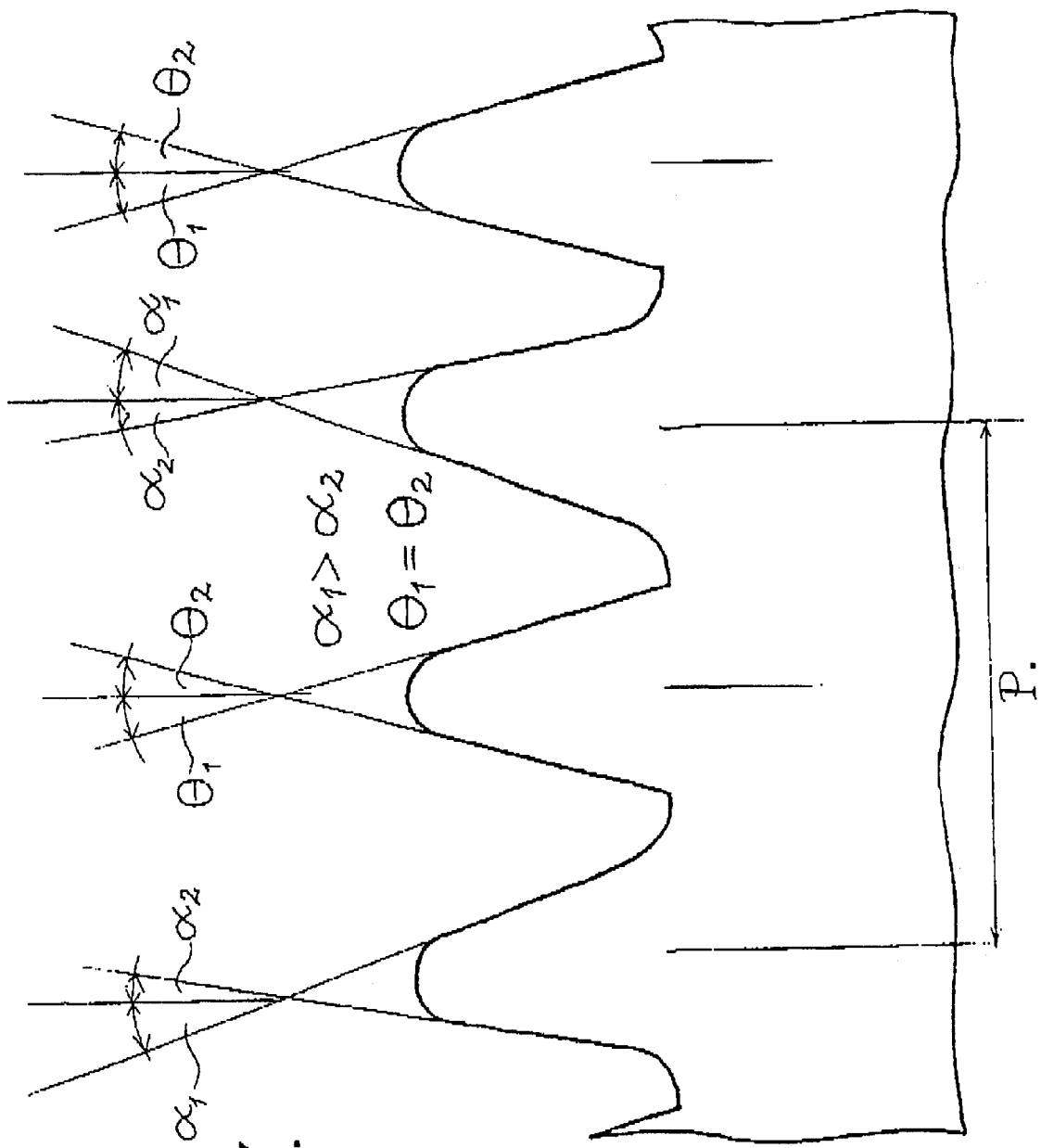

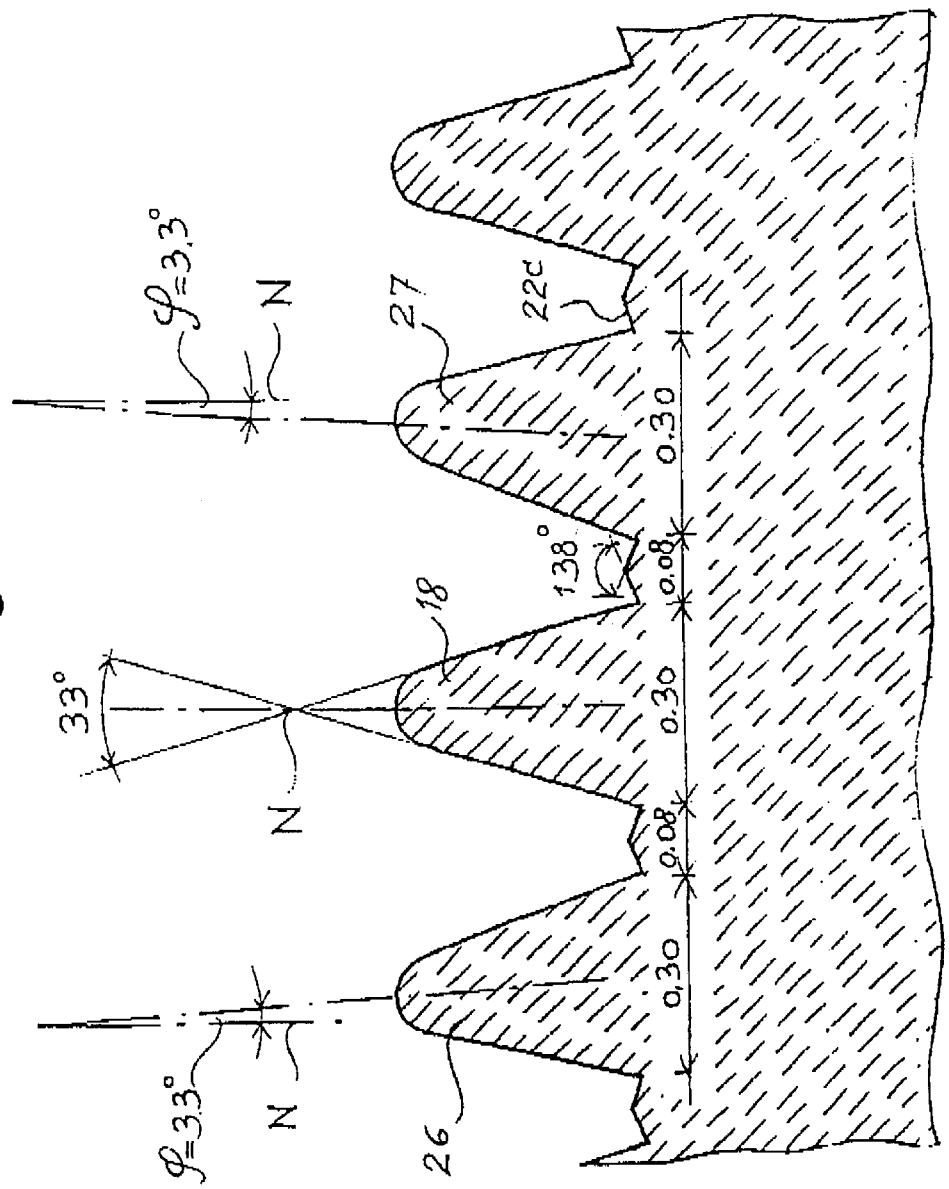

——————— HORISONTAL
— — — — — — VERTIKAL

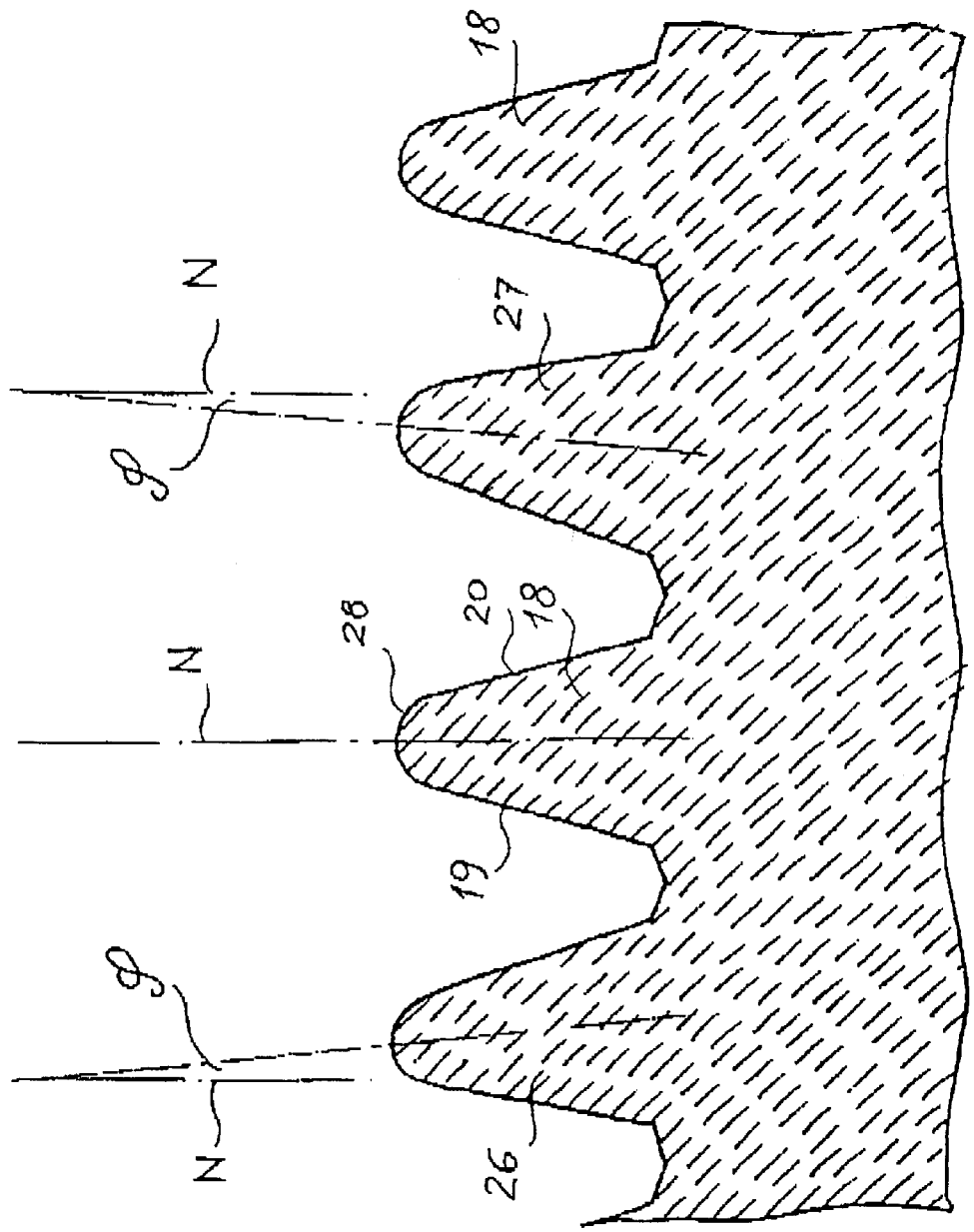

REAR PROJECTION SCREEN ASSEMBLY HAVING A PROJECTION SCREEN WITH REFLECTING RIB LENSES

The invention relates to a projection screen of the type that is illuminated from behind and which has at its front side light dispersing means for receiving beams from an image source with a view to showing an image with substantially homogeneous luminosity over a wide viewing angle. The light dispersing means consist of a number of closely positioned, substantially parallel and in the application position of the screen vertically extending lens elements that have two inclining lens crests, and an intermediate lens.

Such projection screens are used in various apparatuses for generating an image which is visible to the viewers, eg projection of radar images, aeroplane simulators, television, traffic control lights, microfilm readers, video games, video monitors with projected image and for the projection of movies through rear projections. In such apparatuses a light source, placed behind the screen, projects light forwards along a projection axis towards the screen in preparation for generating, at the level of the screen, an image which is spread to all viewers in front of the screen.

When a large number of viewers are present, they will normally spread horizontally, and thus it is desirable to have a wide dispersion of the light horizontally over a wide angle. This is the case in particular with television sets with a rear-projected screen wherein several viewers are sitting in front of the screen at the horizontal level over a relatively wide angle relative to the screen.

One of the problems encountered in connection with rear projection systems is that most of the light is projected along the projection axis which means that the intensity of the image increases the closer the viewer is to the projection axis. Colour video devices with rear projection screens normally use three cathode ray tubes, viz one tube for each of the primary colours, ie red, green, and blue, which tubes project the image to the screen through their own projection lens. In a conventional horizontal arrangement of the cathode ray tubes, the green tube is usually positioned centrally on the projection axis, while the red and the blue cathode ray tubes are arranged with their optical axes at an angle of from five to ten degrees with the projection axis of the green tube. Unless the screen compensates for these displaced positionings, a phenomenon called colour shifting will occur. This phenomenon expresses itself in that, in case the luminosities of the three colours are normalised at the centre of the viewer group, the luminosity relationship varies with the angular position in the horizontal plane all over the viewing angle. This implies that a viewer's perception of the image depends on his place in the horizontal plane in front of the screen.

Furthermore, when rear projected screens are used in and exposed to ambient light, the contrast of the projected image is affected by the light reflection on the front side of the screen. Thus, it is desirable to reduce the reflection of ambient light from the front side of the screen. Various masking technologies have been suggested for the reduction of light reflection, wherein a black, non-reflective sheet has been inserted between the lenses, or the entire front of the screen without black stripes has been dulled.

Various rear-projected screens have previously been suggested for the purpose of increasing the viewing angle in the horizontal plane. U.S. Pat. Nos 4,418,986, 4,469,402, 5,428, 476, and 4,509,822 disclose such a system where a screen is used which has a rear sheet like a Fresnel lens, which is able to collimate the beams from the image source in parallel beams, and a front sheet which is configured with a dispersion lens with vertical, continuous ribs/tops for distributing the light over a specified horizontal viewing angle. According to the well-known technique, the front side of the screen is in essence divided into two lens types; a cylindrical lens for dispersal of the light for a narrow, forwardly directed field of vision, and a total-reflecting lens for further increasing the viewing angle.

Among experts it is well known that it is technically difficult to accomplish a homogeneous light dispersion when using the well-known lens constructions since the well-known systems are constructed with one or two lenses —one lens that transmits the light within a narrow horizontal viewing area, eg +/−25°, and a lens with inner total-reflection that spreads the light from +/−25–30° up to +/−60°, respectively. It applies to both lens types that it is technically difficult to accomplish sufficient overlapping between the two lens types, and especially when the rear projection screen is used for video projection where usually three projection cathode ray tubes are used—one cathode tube for each fundamental colour, and where the optical axes of these usually have a mutual angle of 7–12°.

If eg the green image is projected at right angles on the rear side of the screen, the blue and red images shall be projected against the rear side of the screen with an inclination of eg the mentioned 7° relative to the normal of the screen. However, this may have the effect that a person watching the screen diagonally from the front will see an image which is dominated by either blue or red—depending on whether the relevant person is closest to the optical axis of the projector emitting the blue image or to the projector emitting the red image. In the following, this colour distortion will be designated 'colour-shading'.

The rear projection screen according to the present invention is characterized in that two lens crests are used whose axes of symmetry incline toward each other or away from each other, respectively, and whose axes of symmetry further form an angle relative to the normal to the plane of the screen, and wherein a further lens has been inserted between two said lenses, the axis of symmetry of which is normal to the plane of the screen. The use of a plurality of lenses that are approximately identical, but having different inclinations, provides a more homogenous luminosity.

Thus, the light coming from behind will be reflected one hundred percent when it hits the inner side of two symmetrical lens crests since the precondition for the total reflection is present. A light beam that hits the inner side of the left lens part in this way will be radiated through the lens top. In this way, through the differences in lens inclinations in combination with the inserted, transmitted side lenses at the foot of the inclining lens crests, it is accomplished that the light is dispersed across a wider fan despite the lenses being approximately identical. It also follows that the colour-shading explained above will be neutralised as a consequence of the total-reflected light radiated through the reflecting lenses being spread in a arc of an angle which is approximately 10–30 percent wider than the angle which the optical axes of the light source form in combination.

A viewer viewing the image diagonally from the front will thus perceive three merged images since the lens crests and the transmitted lenses will deflect the light in such a way that beams from the three light sources will be perceived as being approximately parallel. At the same time the advantage will be accomplished which is associated with lenses with one hundred percent reflecting sides; viz the image can be viewed under a wide side-viewing angle. In order to ensure that also the intermediate lenses, where the forwardly directed light is radiated through the tops are blended in such a way that the colour-shading problem is solved, the lenses are made with different curvatures. This means that the relation between the volume of light that is radiated through the asymmetrical lens tops may vary within wide ranges in accordance with the severity of the colour shading problem in the particular appliance.

The invention will now be described in further detail with reference to the drawings, wherein FIG. 1 is a sectional view of a video device;

FIG. 6 illustrates an alternative embodiment wherein the intermediate lenses are convex;

FIG. 7 illustrates a further embodiment wherein the intermediate lenses are concave;

FIGS. 8a and 8b illustrate a figure with reference measurements and angles for the examples mentioned in the description;

FIG. 11 shows another embodiment of the present invention.

Figure 1:
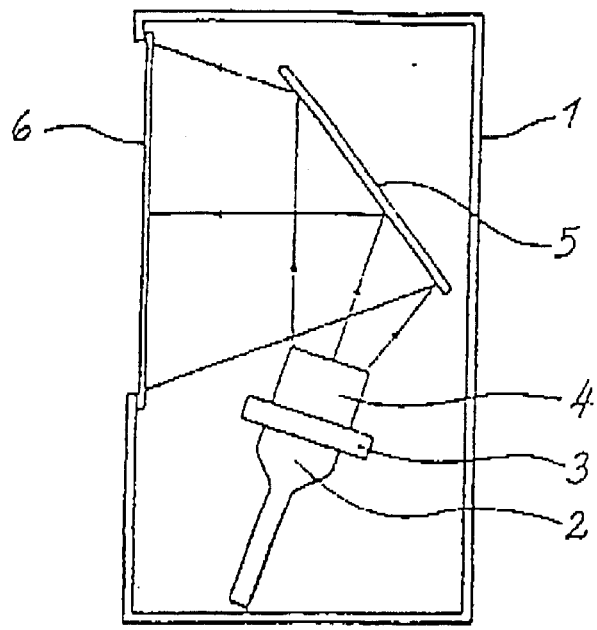

Prior to describing the embodiments of the present invention, the general design of a projection system using rear projection screens according to the invention will be explained with particular reference to FIGS. 1 and 2. FIG. 1 shows as an example a sectional view of a projection TV-set. The video projection device 1 is often constructed with three cathode ray tubes 2, a lens 4, a mechanical coupling 3, a mirror 5, as well as a rear projection screen 6.

Figure 2:
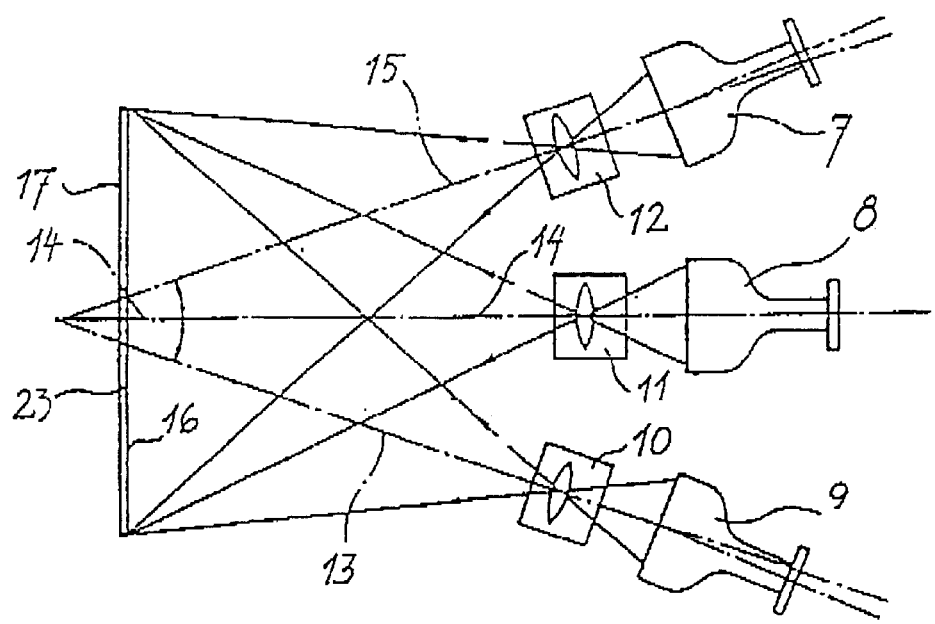
FIG. 2 shows a colour projection TV system comprising a projection screen and three cathode ray tubes with associated lenses.

FIG. 2 shows a rear projection screen with three light sources that have a surface provided with lenses for the illumination and application of projection screens of the kind discussed herein. The three projectors 7, 8 and 9 project TV-images against the rear side of a projection screen 23. Each projector emits green, red and blue light, respectively. The three projectors are arranged horizontally side by side in such a way that the optical axis of the projector 8, which is most often the green projector, is perpendicular to the screen 23.

The optical axes 13,15 of the projectors 7,9 often form an angle of 8–12 degrees relative to the projector 8.

By means of the three projectors 7, 8 and 9 aided by the lenses 10, 11 and 12 mounted in front, it is possible to form an image which is enlarged relative to the projectors, on the screen 23. Very often, a projection screen 23 has a lens structure at the rear 16 and at the front 17. The rear side 16 is often configured as a Fresnel lens that converts the divergent light beams into parallel light beams. The light beams that are transmitted parallel through the rear projection screen 23 medium are dispersed from the front surface of a lens structure 117 in a suitable viewing angle.

Figure 3:
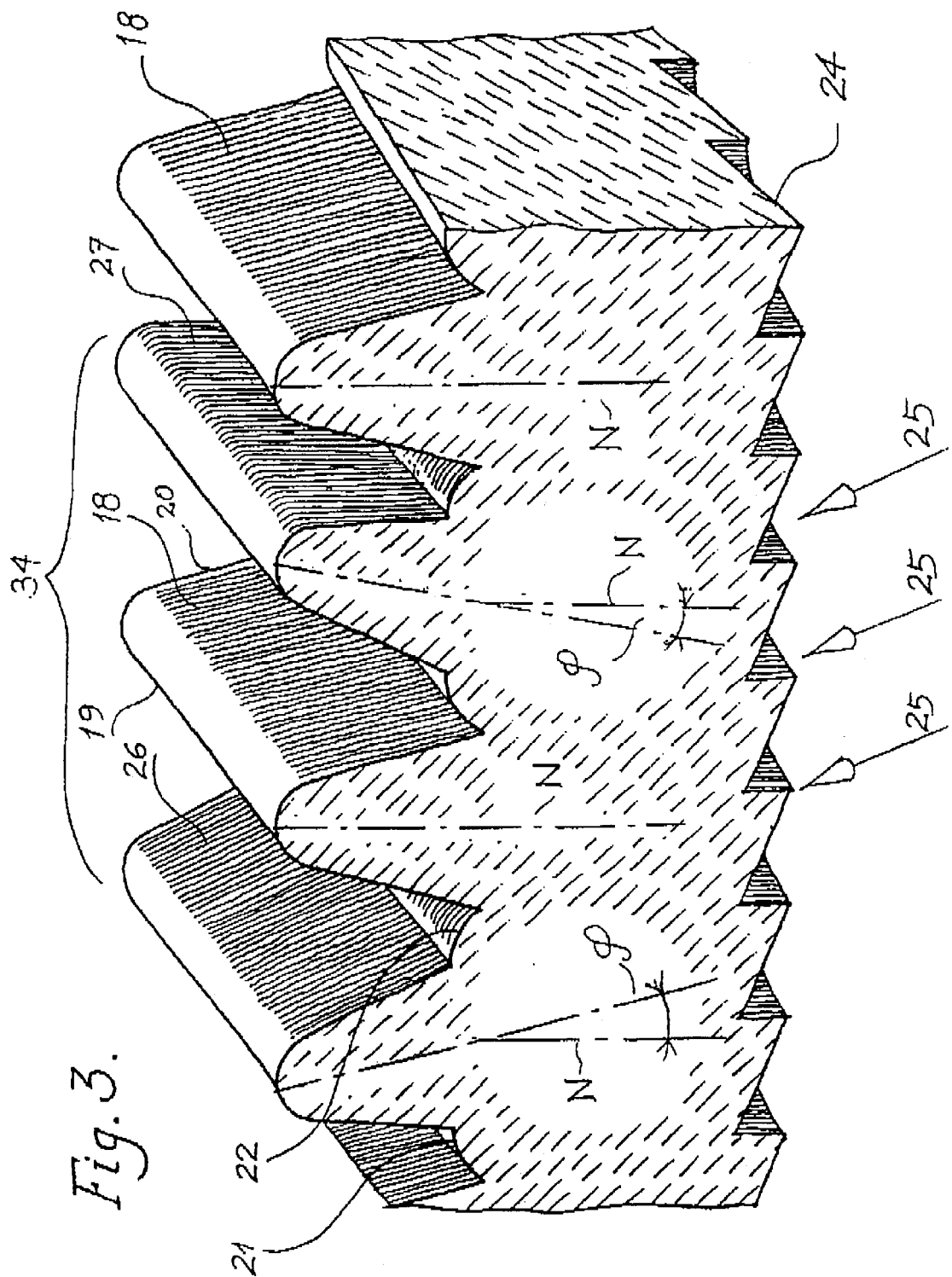
FIG. 3 is a perspective, sectional view of the screen according to the present invention.

In the following, preferred embodiments of the invention will be described with reference to the drawings, wherein:

FIG. 3 are perspective views of rear projection screens according to the invention. As will appear from this figure, the rear projection screen according to the invention has on the surface of its image side a surface 34 provided with lenses that extend vertically in the in-use position of the screen.

In the figures, 18 is used to designate symmetrical, total-reflecting lens with the flanks 19,20 that, in turn, abut on each their transmitting lens 21,22 arranged at the foot of the lenses 18. The axes of symmetry of the two lenses 26,27 form an angle $\psi$ relative to the normal with the screen. The rear side 24 shows a section of a Fresnel lens structure for parallellising the light emitted from the light source 25.

Figure 4:
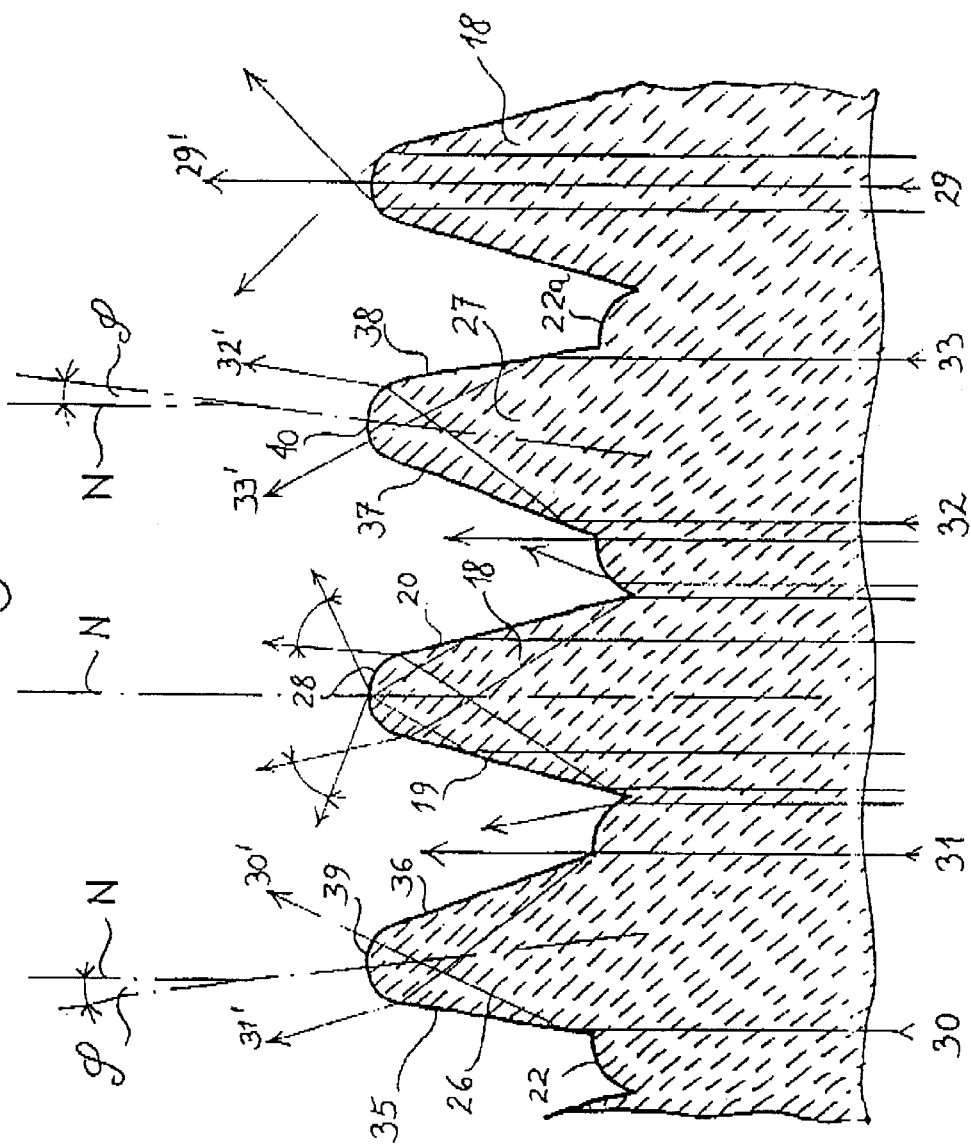
FIG. 4 is a sectional view through the Figure shown in FIG. 3 according to the present invention for illustrating the path of beams.
Figure 5:
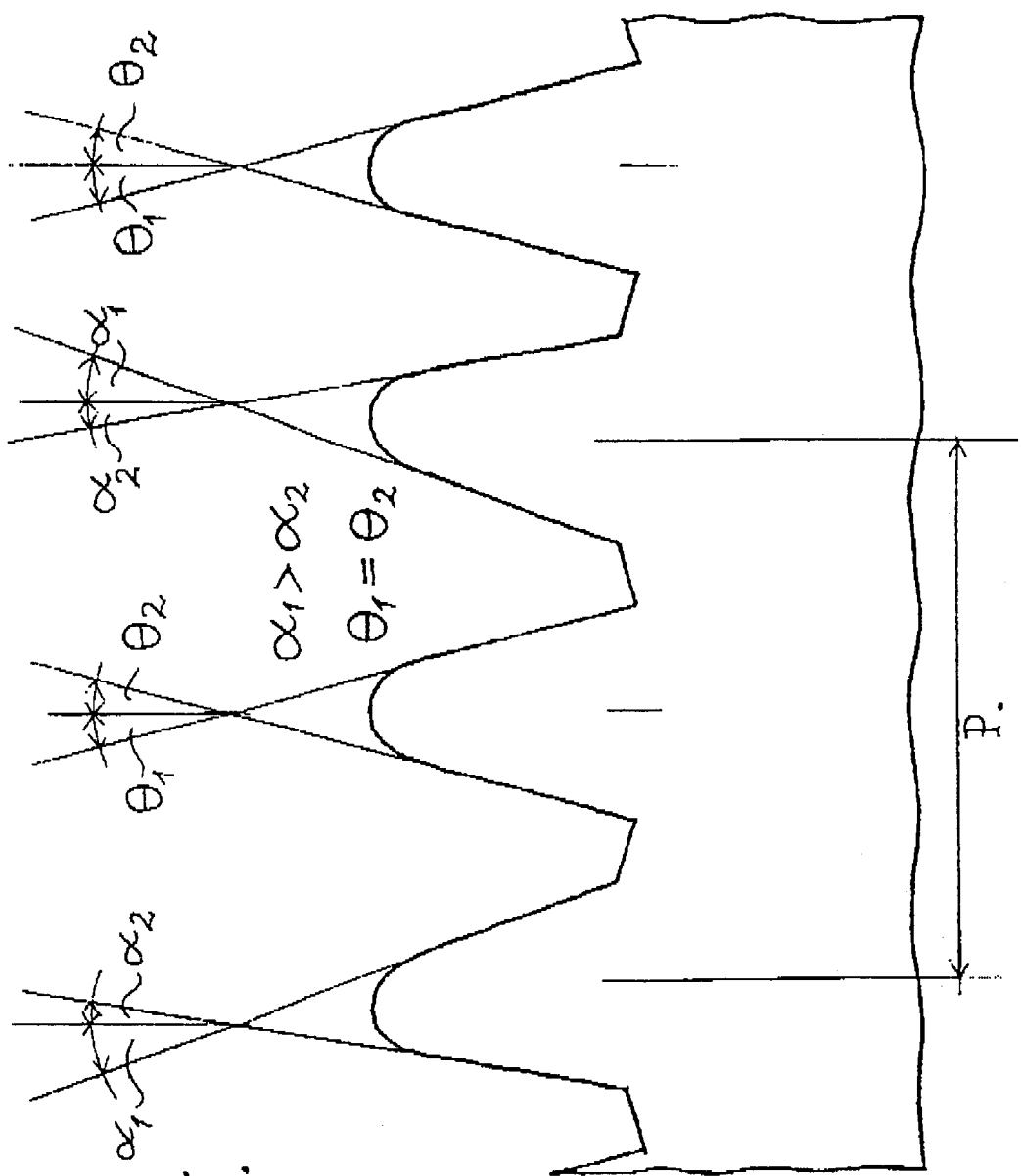
FIG. 5 is a view of the present invention in which, however, the intermediate, transmitting lenses are planar.
Figure 8B:
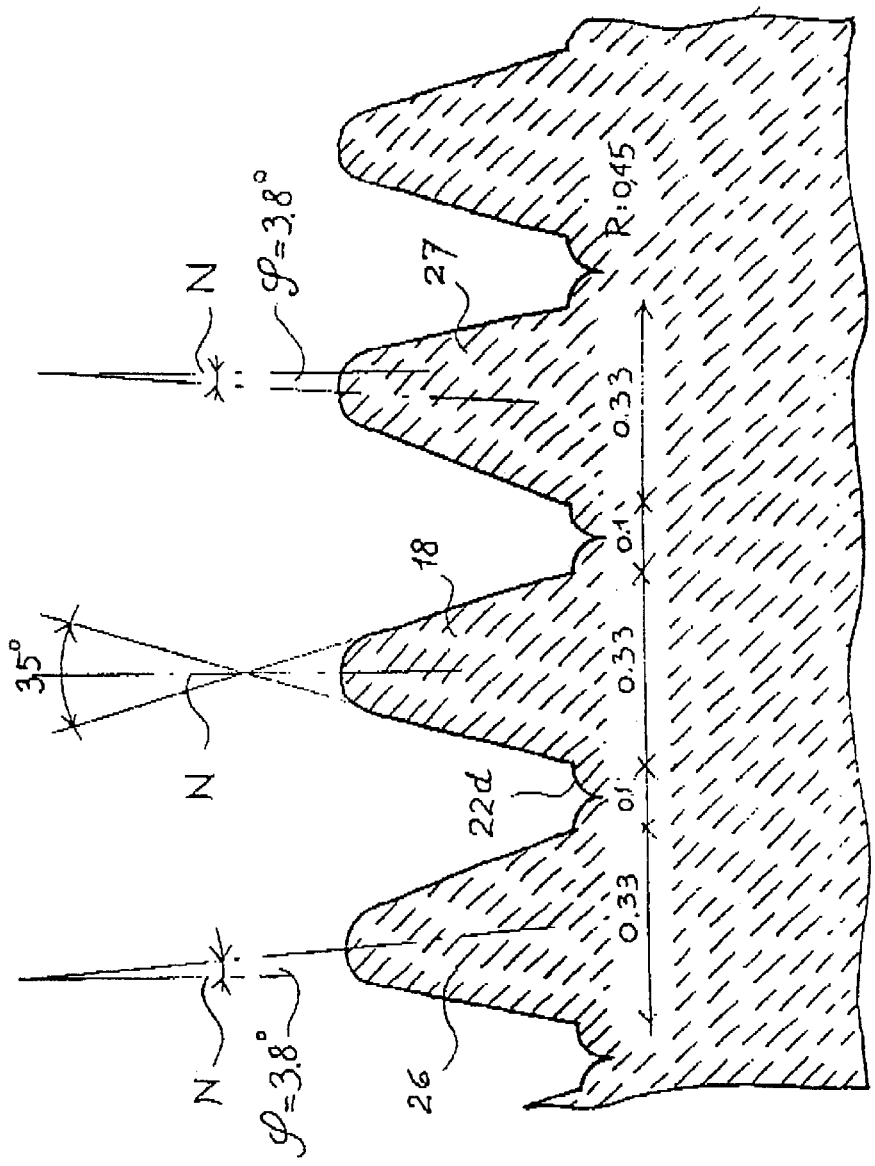

FIG. 4 shows a section of FIG. 3 according to the present invention for illustrating the beam path. For clarity reasons, only the beam path of the green light source is shown. As it appears from the figure, a light beam 29 from the green light source will pass through the centre of the screen lens 28 without deflection. At the arc-shaped part of the lens 28, the light will be deflected within a small visual range, eg +/−15°.

The present invention differs substantially from the prior art techniques in that the total-reflecting lenses 26 and 27 are configured such that their axes of symmetry are not parallel, as will also appear from study of the light beams 30,30' and 32,32' and 33,33', and hereby the previously mentioned colour-shading problem is neutralised.

Figure 9:
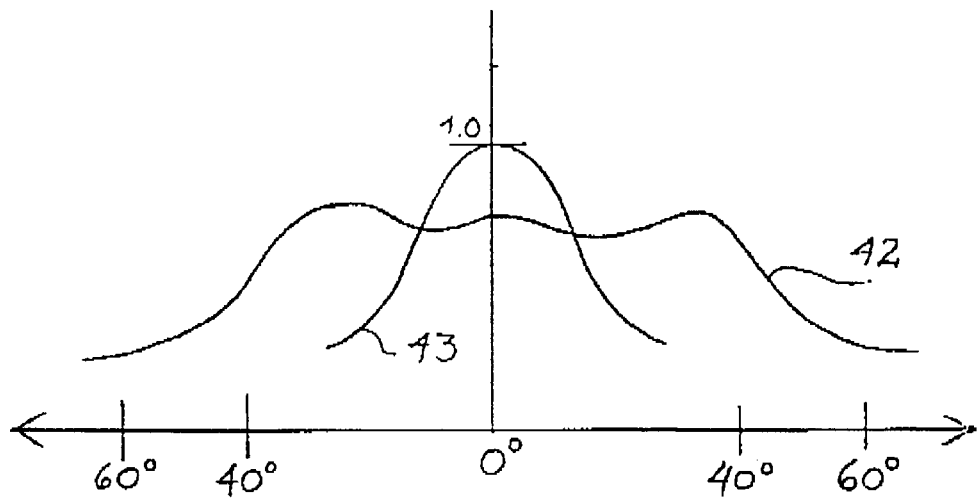
FIG. 9 shows light transmission curves for the total-reflecting lenses and for the transmitting lenses, respectively, as a function of the viewing angle according to the present invention.

In FIG. 9 relative measurement results are given for respective curves 42 of the right lens 27, and the left lens 26 and the lens 18. The bell-shaped curve 43 in the middle is the total measurement result for the lenses 40, 39 and 28 in FIG. 4.

Figure 10:
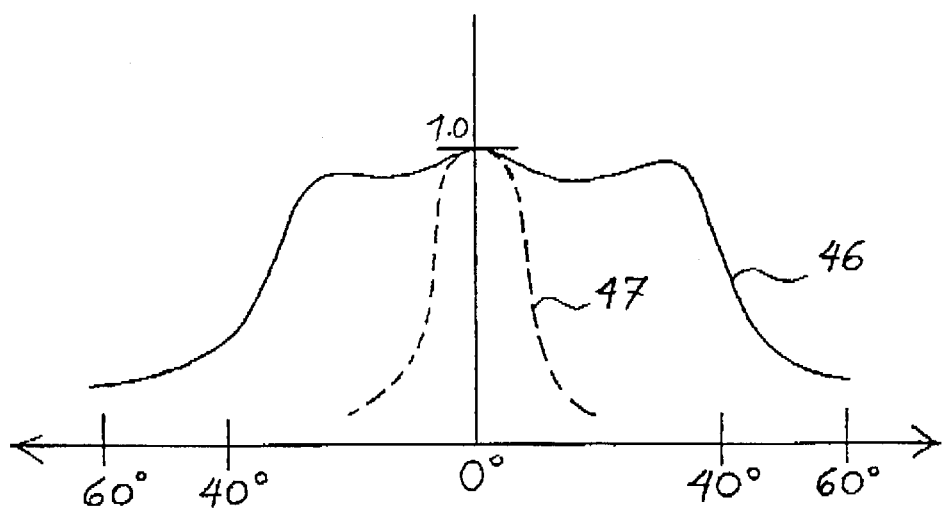
FIG. 10 illustrates optical measurement results of a test according to the present invention.

FIG. 10 shows all lenses in operation for horizontal and vertical measuring, respectively, in accordance with the figure shown in FIG. 4. From the figure, it will appear that the screen according to the invention showed a very constant light at the horizontal level within a viewing angle of +/−45 degrees, curve 46. In order to also accomplish a certain vertical light dispersion, curve 47, light refractive particles can be added to the screen without changing the remaining properties of same. The quantity of such light scattering particles should be a maximum of 45 g/m$^2$, when these particles have an optical refraction index within the range of from 1.5 to 1.58 and a grain size of from 3 μm to 65 μm.

The, bell-shaped curve 44 shown in FIG. 10 is obtained only when a glass powder is added. It should be noted that usually the viewers are positioned in the horizontal plane, and thus the constructor endeavours to achieve the widest viewing angle at that level.

What is claimed is:

1. A rear projection screen assembly comprising:
   an image source for projecting light image beams;
   a projection screen having a rear side and a front side, the rear side facing the image source, the front side comprising a light dispersing material for receiving beams from the image source and for deflecting the individual beams to project an image with a substantially homogeneous luminosity over a wide viewing angle;
   said light dispersing material comprising a plurality of closely arranged, substantially parallel, longitudinally extending reflecting rib lens elements, each having a plane of symmetry and two lateral surface portions;
   the lateral surface portions of the reflecting rib lenses being total-reflecting with respect to light from the image source, the central portions of the reflecting rib lenses being light transmitting, and the lateral surface portions of neighboring reflecting rib lenses being adjoined by transmitting lenses; and wherein the reflecting rib lenses comprise:
first reflecting rib lenses having a plane of symmetry inclined at an angle $\psi$ with respect to a plane normal to the screen,
second reflecting rib lenses having a plane of symmetry inclined at an angle $-\psi$ with respect to a plane normal to the screen,
third reflecting rib lenses having a plane of symmetry normal to the screen, and
wherein $\psi$ differs from 0°.

2. The rear projection screen assembly according to claim 1, wherein the transmitting lenses are either planar, convex or concave.

3. The rear projection screen assembly according to claim 1, wherein the projection screen is made of optical plastic materials.

4. The rear projection screen assembly according to claim 3, wherein the optical plastic materials are acrylic or a mixture of acrylic and styrene.

5. The rear projection screen assembly according to any one of claims 1, 2, 3 or 4, wherein the rear side of the projection screen has a Fresnel lens, or wherein the screen comprises a rib-lens sheet portion, and a Fresnel sheet portion.

6. The rear projection screen assembly according to claim 1, wherein the projection screen is laminated.

7. The rear projection screen assembly according to claim 1, including in the screen, a light-dispersing medium of an organic or inorganic pigment or of a mixture of organic and inorganic pigment.

8. The rear projection screen assembly according to claim 1, wherein the rear side of the projection screen comprises horizontal, parallel extending rib lenses for dispersion of the light in the vertical direction during use.

9. The rear projection screen assembly according to claim 1, wherein tops of the reflecting rib lenses are dulled to avoid reflections from the surroundings.

* * * * *

UNITED STATES PATENT AND TRADEMARK OFFICE
CERTIFICATE OF CORRECTION

PATENT NO.   : 6,304,378 B1
DATED        : October 16, 2001
INVENTOR(S)  : Erik Clausen Page 1 of 1

It is certified that error appears in the above-identified patent and that said Letters Patent is hereby corrected as shown below:

<u>Column 5, claim 1,</u>
Line 3, "angle $\psi$" should read -- angle $\varphi$ --.
Line 6, "angle-$\psi$" should read -- angle $\varphi$ --.
Line 10, "$\psi$ differs" should read -- $\varphi$ differs --.

Signed and Sealed this

Second Day of April, 2002

Attest:

JAMES E. ROGAN
*Attesting Officer*        *Director of the United States Patent and Trademark Office*